United States Patent [19]
Zajichek

[11] 3,834,754
[45] Sept. 10, 1974

[54] ISOLATED TRACTOR PLATFORM

[75] Inventor: William J. Zajichek, New Berlin, Wis.

[73] Assignee: Allis-Chalmers Corporation, Milwaukee, Wis.

[22] Filed: Jan. 29, 1973

[21] Appl. No.: 327,675

[52] U.S. Cl. ............................ 296/35 R, 280/150 C
[51] Int. Cl. ......................... B62d 23/00, B60j 7/24
[58] Field of Search...... 296/28 C, 35 R; 280/106.5, 280/150 C

[56]  References Cited
UNITED STATES PATENTS

| 3,438,672 | 4/1969 | Gipp | 296/35 R |
| 3,525,548 | 8/1970 | Mutka | 296/35 R |
| 3,549,170 | 12/1970 | Shankwitz | 280/150 C |

Primary Examiner—Philip Goodman
Attorney, Agent, or Firm—Arthur L. Nelson

[57] ABSTRACT

A resiliently mounted platform mounted on a tractor having cross beams carried on the chassis for resiliently supporting the platform.

11 Claims, 7 Drawing Figures

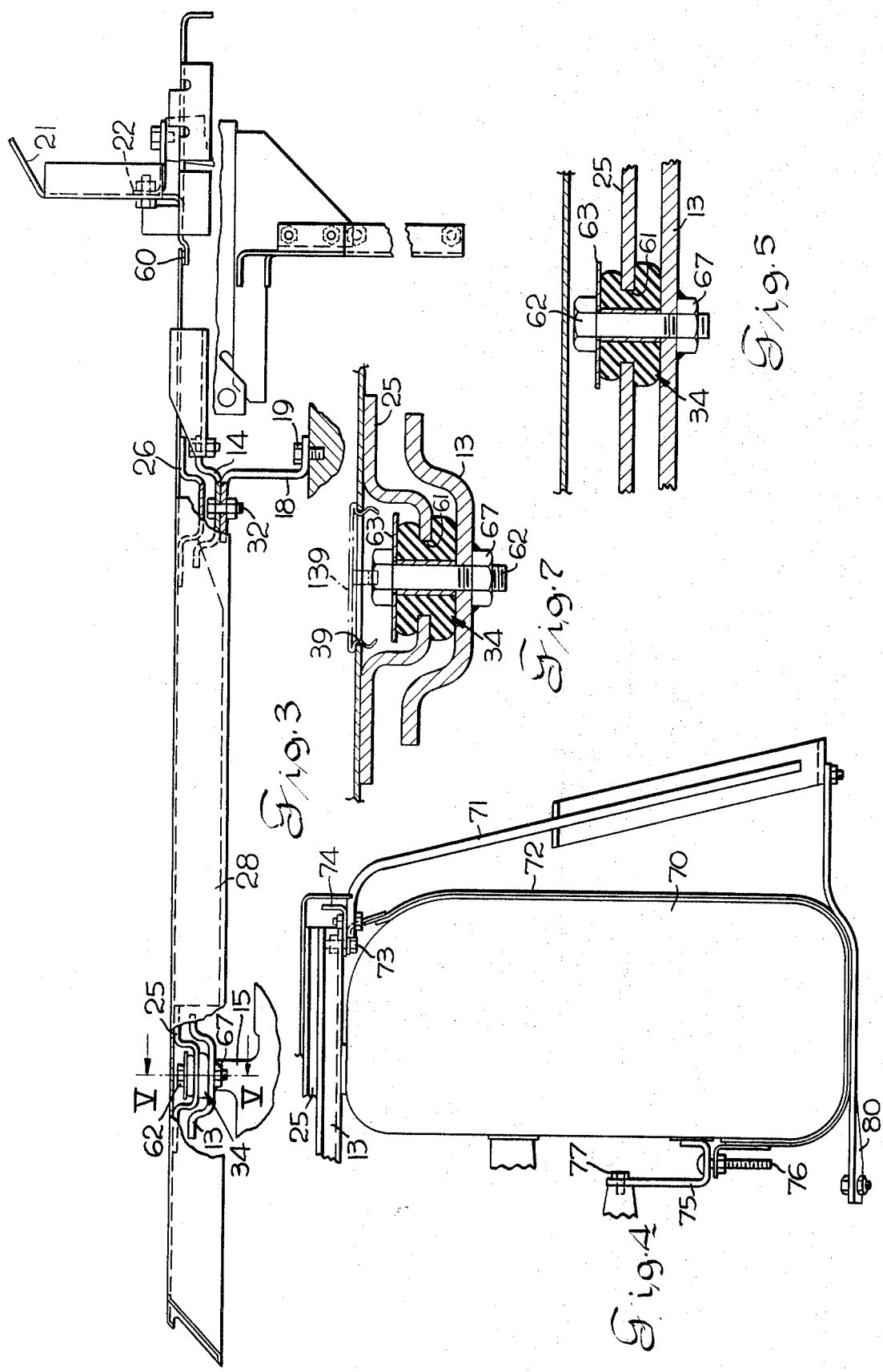

ISOLATED TRACTOR PLATFORM

This invention relates to a resiliently mounted platform on a tractor and more particularly to a means of resiliently mounting the platform assembly having crossbars resiliently supported on cross beams by detachable resilient mounting means.

With the increased size and power output of the modern tractor the need for resiliently mounted platforms at the operator's station is becoming increasingly apparent. While some of the modern tractors employ brackets mounted on the side of the transmission housing to provide a supporting means for a resiliently mounting platform this arrangement is not entirely satisfactory. In the first place, care must be taken to mount each of the brackets at a predetermined height and also the mounting of the rubber isolators on the bracket and connecting them to the platform is generally time-consuming. Not only is this a time-consuming method of fastening the platform to the vehicle, but it can also be cumbersome when it is desired to disassemble the platform from the vehicle when the vehicle is to be repaired.

Accordingly, this invention provides for a convenient means of assemblying a platform support on the vehicle chassis and a convenient means of mounting a platform assembly through resilient means on the platform support. The platform assembly and the platform support can be readily removed from the vehicle to clear the portion of the vehicle at the operator's station to facilitate any repair which may be necessary for the transmission which generally supports the platform and the platform support on a vehicle.

It is an object of this invention to provide a resiliently mounted platform assembly on a support.

It is another object of this invention to mount a platform assembly including a platform and a platform subassembly with resilient isolators carried on the platform subassembly for readily fastening and unfastening the platform assembly to a platform support.

It is a further object of this invention to provide a platform support having cross beams mounted on the vehicle chassis for supporting a platform and/or cab assembly with resilient means for readily fastening and unfastening the platform assembly on said support beams.

The objects of this invention are accomplished by providing cross beams fastened to the top portion of the transmission housings and extending transversely to support the platform assembly. The cross beams define an inverted hat-shaped cross section to provide stiffness to the beams and a similar pair of bars on the platform assembly are nestled in the beams providing the platform support. The platform assembly includes the subassembly which includes cross bars which are fabricated to longitudinal connecting means to provide a rigid structure for supporting the platform. The platform is formed with a plurality of plates mounted on the platform subassembly and define a platform surface at the operator's station. Resilient isolators are carried on the platform subassembly and resiliently support the subassembly by resilient surfaces bearing on the upper and lower portion of the cross bars of the subassembly. The resilient isolators rest on the cross beams of the platform support and threadedly engage a nut which is fabricated to the cross beams to thereby provide a means for quickly assembling and disassembling the platform subassembly from the platform support. The platform support is fastened to the chassis by means of a plurality of bolts which are readily disassembled from the chassis.

Referring to the drawings the preferred embodiment of this invention is illustrated.

FIG. 3 illustrates a side elevation view of the platform assembly mounted on the platform support with portions broken away to more clearly illustrate the relationship of the components.

FIG. 4 illustrates an end view of the platform support and a hanger bracket for carrying a fuel tank.

FIG. 5 is a cross section view of a rubber isolator mounting taken on line V—V of FIG. 3.

FIG. 7 is a cross section view taken on line VII—VII of FIG. 2.

Figure 1:
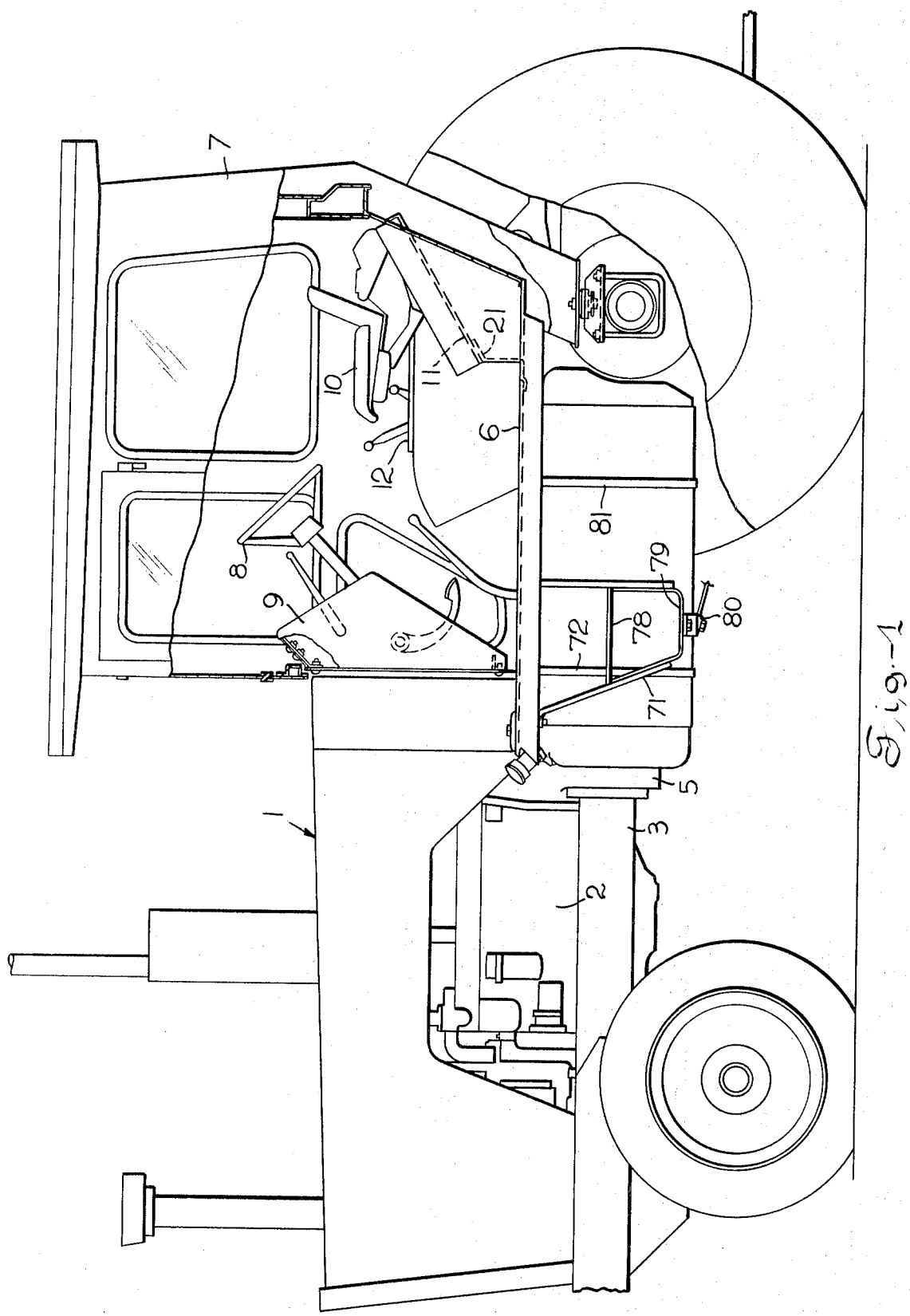
FIG. 1 illustrates the platform mounted on the tractor.

Referring to the drawings FIG. 1 illustrates a tractor 1 including an engine 2 and the transmission housings 5 mounted on the chassis 3 as an integral part of the chassis. The tractor includes a platform 6 mounted on the transmission housings 5. A cab 7 is also mounted on the platform and chassis. A steering wheel 8 is mounted on the control module 9 above the platform for operating the vehicle. A seat 10 is supported on the ramp 11 at the rearward portion of the platform. A control console 12 also provides a means for controlling the operation of the vehicle. The mounting of the platform 6 will be more clearly described and illustrated in subsequent views.

Figure 2:
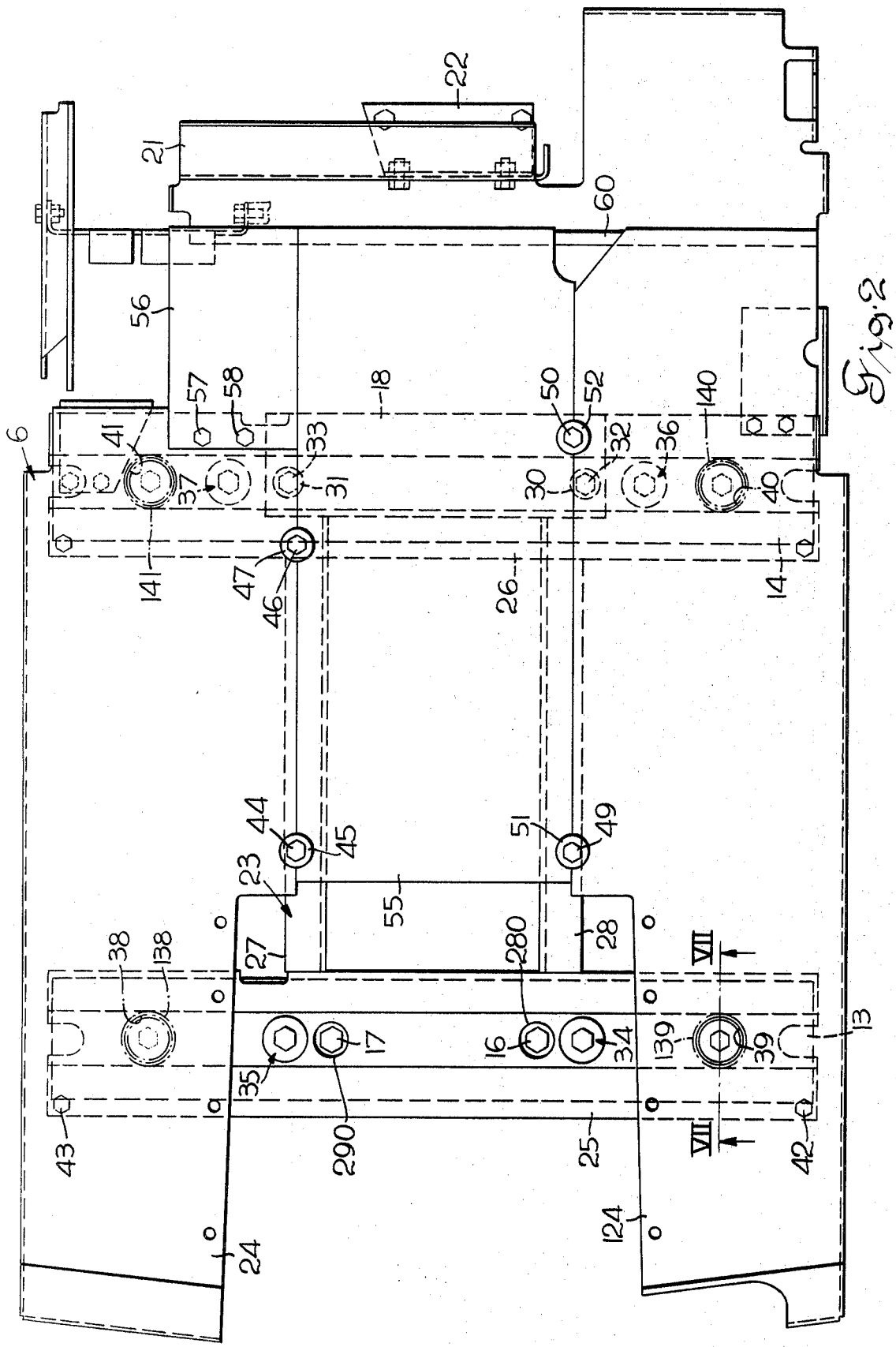
FIG. 2 illustrates a plan view of the platform.

The platform support includes a front cross beam 13 and the rear cross beam 14 and the supporting structure for the cross beams. The front cross beam 13 is supported on embossments 15 of which one is shown in FIG. 3 and the cross beam is fastened to the embossments by a plurality of bolts 16 and 17 as shown in FIG. 2. The rear cross beam 14 is supported on a transverse bracket 18 which is fastened to the chassis by a plurality of bolts 19. The cross beam 14 is fastened to the bracket 18 by a plurality of bolts 32 and 33. The ramp 11 is supported on its forward end by a ramp bracket 21 which is supported on the bracket 22 fastened to the chassis.

The platform assembly includes a subassembly 23 supporting the platform 6. The platform subassembly 23 includes crossbars 25 and 26 forming inverted hat-shaped cross sections. The front crossbar 25 is mounted to nestle within the cross beam 13 while the rear crossbar 26 nestles within the rear cross beam 14. Crossbar 25 and crossbar 26 are fabricated to the longitudinal angle irons 27 and 28 to form a rigid structure of the platform subassembly 23.

The front crossbar 25 is formed with openings 280 and 290 for readily removing the cross beam 13 by insertion of a socket wrench in the openings if desired. Similarly the rear crossbar 26 is also formed with openings 30 and 31 to permit the removal of the cross beam 14 by removing the bolts 32 and 33 when the platform is removed from the platform subassembly. It is also understood that when the platform is removed the isolators 34 and 35, 36, 37 can also be readily removed.

A phantom illustration is also shown whereby the platform can remain assembled with the platform subassembly 23 and yet the isolators can be removed from beams 13 and 14. This is provided for as shown in phantom view FIGS. 2 and 7 of covers 138, 139, 140 and 141 which can be removed and a wrench can be inserted in the openings 38, 39, 40 and 41. These covers have a resilient snap to allow them to seat within the opening and remain in position when the platform is assembled and can be readily removed for dissassembly of the platform and subassembly when desired.

The platform consists of the side panels 24 and 124 which are fastened to the front crossbar 25 by means of bolts 42 and 43, respectively. The bolt and washer 44 and 45 and bolt and washer 46 and 47 provide a means for fastening the side panel 124 of the platform on the subassembly 23. Similarly the bolts 49 and 50 and washers 51 and 52 fasten the side panel 24 on the subassembly 23. The center panel 55 is also fastened to the subassembly by the bolts 44, 46, 49 and 50 as well as the side panels 24 and 124.

The rear side panel 56 is fastened by the bolts 57 and 58. The rear panel 56 and the center panel 55 and the left hand side panel 24 seat on a resilient strip 60 which is supported on the bracket 21.

A plurality of rubber isolators are used to support the platform subassembly on the platform support. Referring to FIGS. 5 and 7 the rubber isolator 34 is positioned in opening 61 in crossbar 25. When bolt 62 threadedly engages a nut 67 which is welded to the underside of cross beam 13, the isolator 34 is entrapped between washer 63 and cross beam 13 thereby providing resilient support for platform subassembly 23.

Referring to FIG. 4 the cross beam 13 is shown extending transversely over the fuel tank 70. The step bracket 71 is shown supported on angle iron 74 which is carried on the underside of the cross beam 13. The fuel tank is supported by a strap 72 which is connected to the bolt 73 on the upper end and extends downwardly around the fuel tank for support on the bracket 75. The strap 72 is fastened to the bracket 75 with bolt 76. Bracket 75 is attached to chassis with bolt 77. A similar arrangement may be provided on the opposite side of the vehicle if it is desired to carry a fuel tank on that side.

Figure 6:
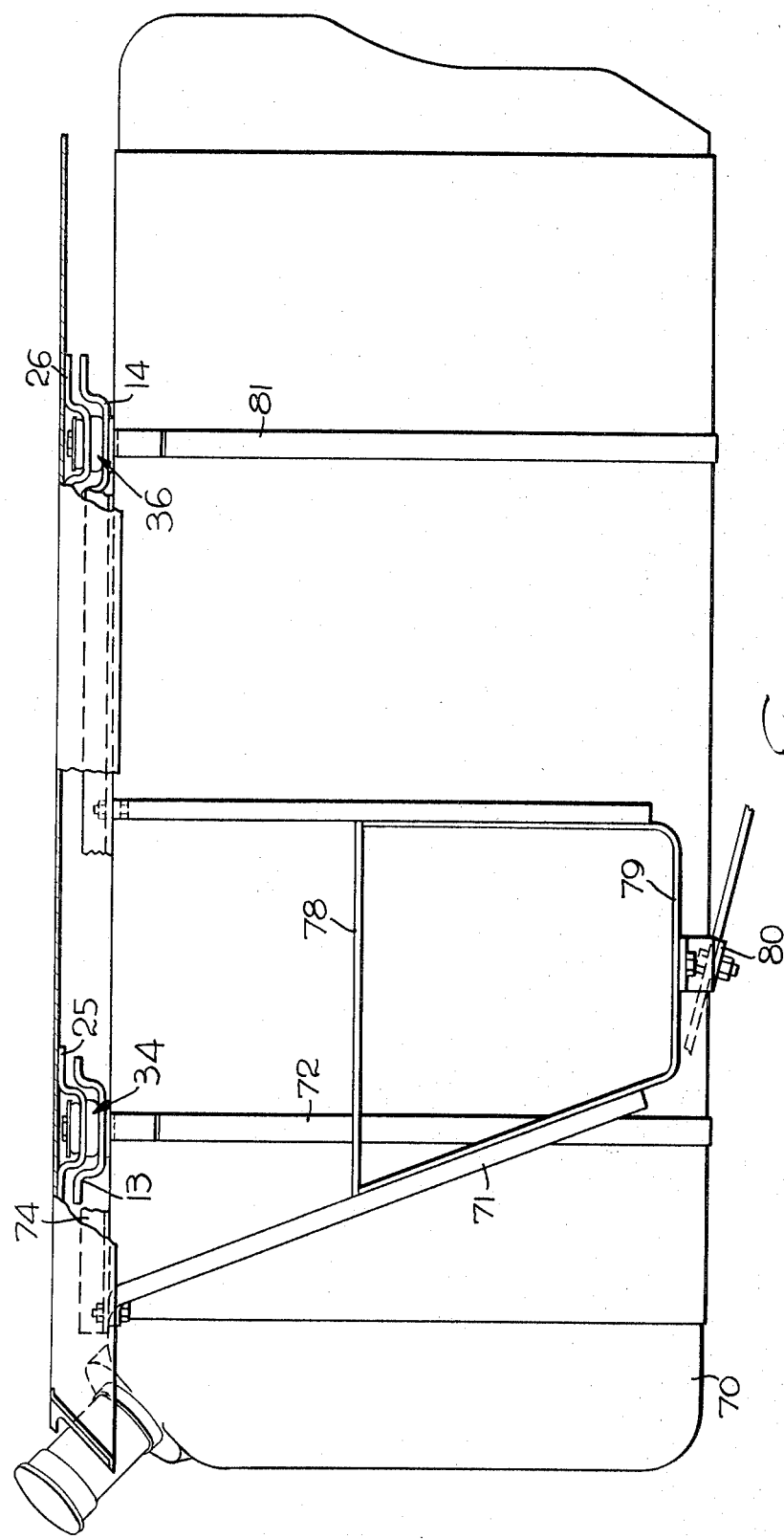
FIG. 6 illustrates a side elevation view of the hanger bracket and the platform support for carrying a fuel tank.

Referring to FIG. 6 the cross beam 13 is shown mounted for supporting the fuel tank bracket and also the crossbar 25 is shown immediately above the cross beam 13. The step bracket 71 is shown with the steps 78 and 79 for stepping onto the vehicle. The bar 80 extends from the underside of the vehicle to engage the step 79 to provide added support for the step bracket 71.

It is also noted that the rear crossbar 14 is mounted to carry the strap 81 which extends around the fuel tank and under the underside of the tank to engage a bracket similar to bracket 75 which is connected to the chassis. Accordingly, the cross beams 13 and 14 provide a means for supporting the platform and can also be used as an optional means of supporting the fuel tank as shown.

The platform support which includes the two cross beams 13 and 14 are mounted on the chassis for supporting the vehicle platform and may also be used to support the fuel tanks as indicated. The cross beams 13 and 14 also carry a plurality of nuts 67 which are welded to their underside and are aligned with an opening extending through the cross beams. This provides a means whereby a bolt can be readily inserted through the opening in the cross beam and the bolt can be readily screwed into the nut to securely attach the isolated platform subassembly to the vehicle. Similarly, the platform subassembly can be readily removed.

The cross beams 13 and 14 are mounted on the chassis and form the platform support. The cross beams 13 and 14 provide a mounting surface which extends transversely of the vehicle chassis and additional rubber isolators may be mounted on the crossbars 25 and 26 to provide support for a cab or for the platform alone depending on the weight which is to be carried on the resilient isolators. With each cross beam forming a hole for reception of the bolt of the isolator and a nut welded on the underside of the hole it is easy to assemble the platform assembly onto the platform support.

The platform assembly includes a platform subassembly 23 which includes two crossbars 25 and 26 which are fabricated to the angle irons 27 and 28 to provide a rigid structure for support on the cross beams. Each of the isolators is fastened onto the crossbars so that the assembly is ready to position on the cross beams. When the isolators are aligned for fastening on the cross beams the bolts 62 are then fastened to the nuts 67 and the assembly of the platform subassembly and the platform support is complete. The platform which includes the side panels 24 and 124 and the center panel 55 as well as the rear side panel 56 which are then assembled on the platform subassembly by means of bolts 42, 43, 44, 46, 49, 50, 57 and 58. By fastening the platform on the platform subassembly the assembly is complete and ready for operation. It can be seen that if it is desired to gain access to the transmission housing or any part of the vehicle the platform and its subassembly and the platform support can all be readily disassembled. The platform assembly and its supporting structure can be adapted to an automated assembly if desired.

The embodiments of the invention in which an exclusive property or privilege is claimed are defined as follows:

1. A resilient mounting assembly on a tractor comprising, a tractor chassis, a platform support mounted on said chassis, said platform support including a pair of beam members extending across the upper side of said chassis and mounted on said chassis, a platform assembly including, a platform subassembly mounted on said beam members, a platform mounted on said platform subassembly a plurality of resilient isolators mounted on said platform assembly, each of said isolators including resilient means supporting said platform assembly on said platform support, a threaded member connected to said resilient means, a second threaded member on said beam members of said platform support threadedly engaging said threaded member on said platform assembly for releasably fastening said platform on said platform support.

2. A resilient mounting assembly on a tractor as set forth in claim 1 wherein said beam members define inverted hat-shaped cross sections for mounting on said chassis to provide rigidity to said cross beams.

3. A resilient mounting assembly on a tractor as set forth in claim 1 wherein said threaded member includes a bolt, said second threaded member includes a nut.

4. A resilient mounting assembly on a tractor as set forth in claim 1 wherein said beam members define inverted hat-shaped cross sections, a platform subassembly including a pair of crossbars defining inverted hat-shaped cross sections for nestling in said cross beams to thereby provide a supporting structure for said platform.

5. A resilient mounting assembly on a tractor as set forth in claim 1 including means removably fastening said platform on said subassembly.

6 A resilient mounting assembly on a tractor as set forth in claim 1 wherein said platform assembly includes, said platform with said platform subassembly supporting said platform, said platform including a central plate, means removably fastening said central plate on said platform subassembly to permit access to the central portion of said chassis when said central plate is removed.

7. A resilient mounting assembly on a tractor as set forth in claim 1 wherein said beam members define a plurality of holes, said second threaded member defines a nut fastened to the underside of said beam members aligned with said holes, said platform assembly includes said platform subassembly defining two crossbars having a plurality of holes aligned with the holes in said beam members, each of said resilient isolators mounted in said openings of said crossbars wherein each of said resilient members includes a bolt for threadedly engaging said nuts on the bottom of said beam members to thereby fasten said platform subassembly to said platform support.

8. A resilient mounting assembly on a tractor as set forth in claim 1 wherein said beam members include means adapted for supporting a fuel tank.

9. A resilient mounting assembly on a tractor as set forth in claim 1 wherein said platform assembly includes said subassembly for supporting a platform with said platform supported on said subassembly, said platform including a plurality of plates removably fastened to said subassembly to provide a platform on said tractor.

10. A resilient mounting assembly on a tractor as set forth in claim 1 wherein said platform assembly includes crossbars supported on said beam members, fastening means fastening said beam members to said chassis, means defining openings in said cross bars for access to remove said fastening means on said beam members when said crossbars are assembled on said beam members.

11. A resilient mounting assembly on a tractor as set forth in claim 1 wherein said platform assembly includes said platform subassembly mounted on said platform support, with said platform mounted on said platform subassembly, means defining access holes in said platform for removing said insulators connecting said platform subassembly to said platform support when said platform support and platform assembly are assembled on the chassis of said tractor.

* * * * *